United States Patent

[11] 3,603,198

| [72] | Inventor | LeRoy P. Seefeld<br>Downey, Calif. |
|---|---|---|
| [21] | Appl. No. | 820,050 |
| [22] | Filed | Apr. 29, 1969 |
| [45] | Patented | Sept. 7, 1971 |
| [73] | Assignee | Northrop Corporation<br>Beverly Hills, Calif. |

[54] FILLER MEMBER FOR JOGGLE JOINT
2 Claims, 5 Drawing Figs.

[52] U.S. Cl. ............................................. 85/50
[51] Int. Cl. ....................................... F16b 43/00
[50] Field of Search ................................ 85/50 AT,
50, 61, 3 K, 8.6; 285/3, 4

[56] References Cited
UNITED STATES PATENTS
2,046,571  7/1936  McCain ........................ 85/61
2,537,776  1/1951  Markl .......................... 285/4
2,772,596  12/1956  Trussell ....................... 85/50
2,874,749  2/1959  Brink .......................... 85/50

FOREIGN PATENTS
189,990  12/1922  Great Britain ............... 85/50

Primary Examiner—Edward C. Allen
Attorneys—Harold L. Fox and Willard M. Graham

ABSTRACT: A washerlike filler member including body and tang portions, the latter portion being integrally constructed with the body portion. The body portion serving to occupy the space inherently present in "joggled" joints and the tang portion functioning as an aid in positioning the body portion. The tang portion is broken away or separated from the body portion after the latter has been properly positioned and secured in position.

PATENTED SEP 7 1971
3,603,198
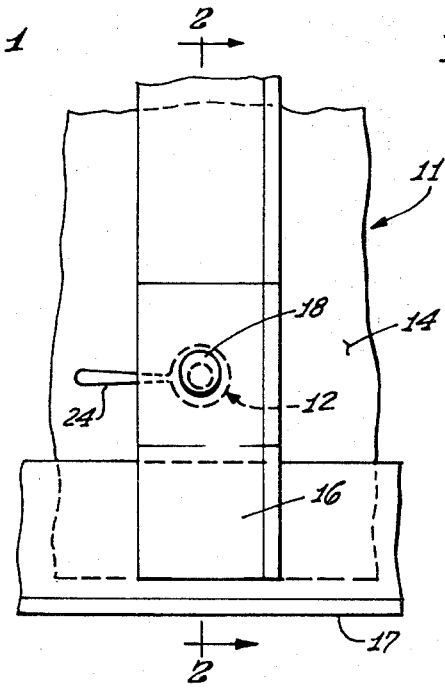
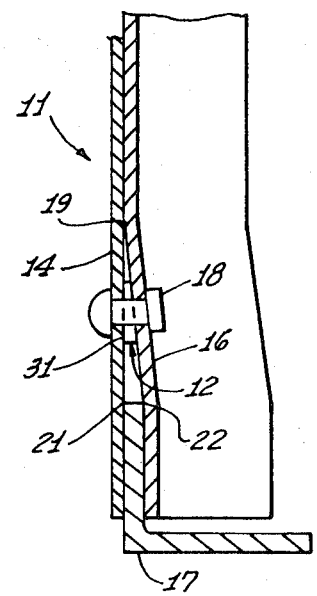
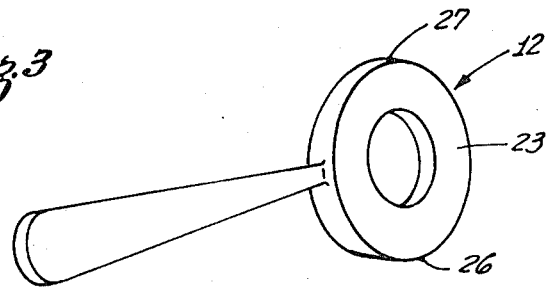
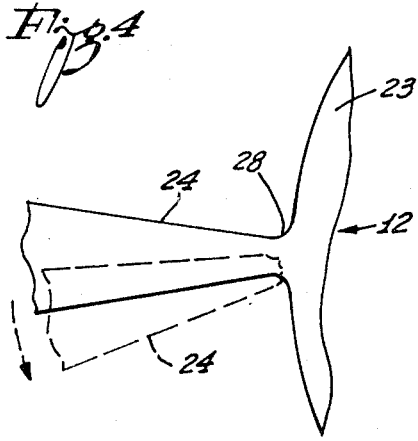
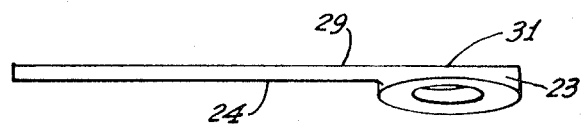
INVENTOR:
LeRoy Paul Seefeld
By Harold L. Fox
AGENT

3,603,198

FILLER MEMBER FOR JOGGLE JOINT

The present invention pertains generally to filler members for "joggled" joints and more particularly to washerlike filler members including body and tang portions adapted to take the place of a conventional tapered shim of rectangular configuration. The body portion providing means for occupying the space inherently present in a "joggled" joint. The tang portion is constructed integral with the body portion and functions to provide means for properly positioning the body portion in the aforementioned "joggle" joint and is subsequently broken away or separated from the body portion.

A "joggled" joints or connections are normally utilized in the airframe industry in effecting a crossover between a pair of generally elongated members. The foregoing is especially true where weight is a prime consideration, illustrations of "joggled" joints in the airframe industry include installations in which stringer members crossover rib members and vice versa.

Connections of the above type are normally referred to as "joggled" joints. It is common practice to insert a tapered filler member of shim of rectangular configuration in the "joggle washout" inherently present in a "joggle" joint. The filler member does not carry any structural load but merely functions to provide support for a rivet or the like, associated with the connection, and maintains the spacing and relationships between the associated members.

To the best of Applicant's knowledge a filler member as disclosed herein, providing the advantages discussed below, has not been disclosed to date and is not currently available. Briefly the present filler member includes body and tang portions, the body portion constitutes a washerlike member having a tang portion integrally constructed with the body portion. The tang portion being utilized during installation as a positioning aid and is subsequently broken away in a manner that will be apparent as the disclosure progresses.

All joggle joints have varying washout angles which requires an infinite number of versions of tapered shims. The washerlike filler reduces the number of taper variations to two. The requirement of different widths and lengths of rectangular tapered shims is eliminated.

It is an object of the present invention to provide a washerlike filler member including body and tang portions, the latter serving as a positioning aid for the body portion.

It is another object to provide a filler member including body and tang members and in which the latter portion is integrally constructed with the body portion and is subsequently broken away from the body portion.

It is another object to provide a filler member which is more economical to manufacture, eliminates the need for hundreds of variations of filler members as previously used and may be fabricated in a plurality of materials.

Although the characteristic features of the present invention are particularly pointed out in the appended claims, the invention itself, also the manner in which it may be carried out, will be better understood by referring to the following description taken in connection with the accompanying drawings forming a part of this application and in which:

FIG. 1 is an elevational view of a typical installation employing a filler member as disclosed herein.

FIG. 2 is a sectional view of FIG. 1, the view being taken on the line 2—2 of FIG. 1.

FIG. 3 is a perspective view of a filler member as disclosed herein and utilized in the installation of FIGS. 1 and 2.

FIG. 4 is an enlarged fragmentary view particularly showing the connection between the body and tang portions.

FIG. 5 constitutes a second embodiment of the filler member similar to the filler member shown in FIG. 3.

Referring to the drawings, a typical installation 11 utilizing a filler member 12 of the type disclosed herein as shown in FIGS. 1 and 2. Principle components of the installation 11 includes a plate 14, first elongated member 16, second elongated member 17, filler member 12 and rivet member 18. The installation referred to above and as shown in FIGS. 1 and 2, particularly the members 16 and 17, is referred to as a "joggle" joint or connection.

Installations or joints as referred to above, also installations of similar construction, define a space in which the "joggled" member 16 is unsupported referred to as the "joggle" washout. In the embodiment shown, as well as other embodiments, the "joggle" washout constitutes a space of triangular configuration identified by the numerals 19, 21 and 22, it is in this space that the filler member 12 is designed to occupy.

In most instances the filler member 12 does not carry any load, rather it functions to provide support for the rivet 18 during installation and maintain the proper relationship between members defining the "joggle" washout.

A preferred embodiment of the filler member 12 is shown in FIGS. 3 and 4. The member 12 includes body and tang portions 23 and 24, respectively, the latter portion being constructed integrally with the portion 23 and serves a purpose which will become apparent as the disclosure progresses. The body portion 23 is of washerlike configuration, the side faces of which are tapered with respect to each other. The thickest and thinnest portions of the portion 23 are located at diametrical opposite positions as indicated by the numerals 26 and 27, respectively, in FIG. 3. The center line of the tang portion has a 90° relationship with respect to the aforementioned line 26–27. The tang portion 24 is shaped so that the area of smallest cross section is located adjacent the portion 23 as indicated by the numeral 28 (FIG. 4).

With this type of construction, the tang portion is easily broken away or separated from the member 23 after the latter is properly positioned between the members 14 and 16 and the rivet 18 upset or bucked. Further, inasmuch as the O.D. of the member 12 is relative small with respect to the altitude of the "joggle" washout (19, 21 and 22) it will be apparent that the taper angle is not critical. That is two or three angles of taper will be sufficient thereby eliminating the necessity to stock a large number of similar filler pieces as would be the case if rectangular tapered shims were used.

It will be noted that the tang portion 24 is equally spaced between the side faces of the body portion 23 in FIG. 3, however, the tang portion may be positioned flush with respect to one of the side faces of the body portion as shown in FIG. 5. Positioning the handle in the above manner enables the member 11 to be positioned in a "joggle" washout in a proper relation with respect to associated members. In FIG. 5 all points in the lower surface 29 of the tang portion 24, also all points in the lower surface 31 of the body portion 23, are located in a common plane. Thus surfaces identified by the numerals 29 and 31 may be positioned in flush relationship with the surface of the member 16. Thus a further truing and positioning means for the filler member 12 is provided.

Thus it will be seen that a filler member for a "joggle" washout is provided functioning to provide the objects of the invention listed above.

While in order to comply with the statute, the invention has been described in language more or less specific as to structural features, it is to be understood that the invention is not limited to the specific features shown, but that the method and means herein disclosed comprise several forms of putting the invention into effect, and the invention is therefore claimed in any of its forms or modifications within the legitimate and valid scope of the appended claims.

I claim:

1. In a "joggled" washout occurring in a structural joint when one structural member crosses over another structural member comprising:
   a. a filler member of integral construction adapted to be positioned and secured in the washout portion of the "joggle" joint including body and tang portions;
   b. said body portion being of circular configuration including side faces having a canted relation with respect to each other and having an aperture of circular configuration located centrally thereof;

c. said tang portion being of elongated configuration having a longitudinal axis extending radially outwardly with respect to said body portion and in which said tang portion is symmetrically constructed with respect to said longitudinal axis and the latter having a normal relation with respect to a diametrical line extending between points on the periphery of said body portion of maximum and minimum thickness;
d. and in which the cross-sectional area of said tang portion, adjacent said body portion, being less than the other cross-sectional areas of said tang portion providing means whereby the latter may be easily broken away or separated from said body portion after the latter is properly positioned and secured in the "joggle" washout.

2. In structure as set forth in claim 1:
a. in which the tang portion includes side faces;
b. and all points in one side of said body portion and one side face of said tang portion being located in a common plane.